United States Patent
de Boer

(10) Patent No.: US 10,764,276 B2
(45) Date of Patent: Sep. 1, 2020

(54) CERTIFICATE-INITIATED ACCESS TO SERVICES

(71) Applicant: SAP SE, Walldorf (DE)

(72) Inventor: Martijn de Boer, Heidelberg (DE)

(73) Assignee: SAP SE, Walldorf (DE)

( * ) Notice: Subject to any disclaimer, the term of this patent is extended or adjusted under 35 U.S.C. 154(b) by 250 days.

(21) Appl. No.: 16/118,725

(22) Filed: Aug. 31, 2018

(65) Prior Publication Data

US 2020/0076794 A1 Mar. 5, 2020

(51) Int. Cl.
*H04L 29/06* (2006.01)
*H04L 9/08* (2006.01)
*H04L 29/08* (2006.01)

(52) U.S. Cl.
CPC ........ *H04L 63/0823* (2013.01); *H04L 9/0825* (2013.01); *H04L 63/0807* (2013.01);
(Continued)

(58) Field of Classification Search
CPC ............. H04L 2209/68; H04L 63/0807; H04L 63/0815; H04L 63/0823; H04L 63/0869;
(Continued)

(56) References Cited

U.S. PATENT DOCUMENTS

2012/0011358 A1* 1/2012 Masone ................ G06F 21/305
713/153
2013/0191884 A1 7/2013 Leicher et al.
(Continued)

OTHER PUBLICATIONS

Hardt, D et al., "The OAuth 2.0 Authorization Framework; rfc6749.txt", The Oauth 2.0 Authorization Framework; rfc6749.txt, Internet Engineering Task Force, ITEF; Standard, Internet Soceity (ISOC), 4 Rue Des Falaises Ch—1205 Geneva, Switzerland, Oct. 13, 2012, pp. 1-76, 76 pgs.

(Continued)

*Primary Examiner* — Joseph P Hirl
*Assistant Examiner* — Ka Shan Choy
(74) *Attorney, Agent, or Firm* — Buckley, Maschoff & Talwalkar LLC

(57) ABSTRACT

A system includes terminating, at a reverse proxy, a mutual authentication handshake with a client computing system, the handshake including reception by the reverse proxy of a public key certificate associated with the client computing system, generating, by the reverse proxy, of an authentication token based on the public key certificate, receiving, at the reverse proxy, a request to access an application from the client computing system, forwarding the request and the authentication token from the reverse proxy to the application, receiving the request and the authentication token at the application, requesting, by the application, of an authorization token from an OAuth server based on the authentication token, receiving the authorization token from the OAuth server, storing the authorization token in association with a session identifier associated with the request received from the client computing system, and transmitting a response to the client computing system based on the authorization token and the request received from the client computing system.

18 Claims, 6 Drawing Sheets

(52) U.S. Cl.
CPC ........ *H04L 63/0869* (2013.01); *H04L 63/102*
(2013.01); *H04L 67/2895* (2013.01); *H04L*
*67/10* (2013.01)

(58) Field of Classification Search
CPC ....... H04L 63/10; H04L 63/102; H04L 67/10;
H04L 67/2895; H04L 9/0825; H04L
9/0844; H04L 9/3213; H04L 9/3263;
H04L 9/3273
See application file for complete search history.

(56) References Cited

U.S. PATENT DOCUMENTS

| | | |
|---|---|---|
| 2015/0180863 A1 | 6/2015 | Kobayashi |
| 2016/0014119 A1* | 1/2016 | Inoue ................. H04L 63/0807 726/9 |
| 2017/0111338 A1* | 4/2017 | Malatesha .......... H04L 67/1097 |

OTHER PUBLICATIONS

Rescorla, Mozilla E.: "The Transport Layer Security (TLS) Protocol Version 1.3; rfc8448.txt", Internet Engineering Task Force, IEFT; Standard, Internet Society (ISOC) 4, Rue Des Falsises, Ch—1205, Geneva, Switzerland, Aug. 11, 2018, pp. 1-160, 160 pgs.
"Communication: The Extended European Search Report", dated Jun. 7, 2019 (Jun. 7, 2019), European Patent Office, for European Application No. 18248022.8-1218, 6 pgs.

* cited by examiner

CERTIFICATE-INITIATED ACCESS TO SERVICES

BACKGROUND

Certificate-based authentication (e.g., via the Transport Layer Security (TLS) protocol) utilizes public key certificates to establish trust and to secure communications between parties. Generally, a public key certificate binds a public key to a named entity, where the named entity is assumed to possess a private key corresponding to the public key. A signature or assertion which is decryptable using the public key (i.e., generated using the private key) can therefore be assumed to have been generated by the named entity.

In conventional cloud-based computing, a client device requests functionality from applications, or services, executing in a public or private cloud. According to a microservices architecture, an application is implemented using a collection of fine-grained loosely-coupled services communicating via lightweight protocols. These services typically delegate responsibility for client authentication and authorization to an OAuth server. For example, an OAuth server determines authorizations to a service based on authenticated user identity and issues an authorization token specifying the authorizations. The authorization token may be provided to the service, which grants access to corresponding resources based on the specified authorizations.

It may be desirable for a client system which does not support OAuth protocols to call a cloud service using certificate-based authentication (e.g., where the client system is an Enterprise Resource Planning on-premise system). However, even if the cloud service endpoint is capable of terminating a certificate-based (e.g., TLS) connection, the client certificate will not be usable by the service or by the OAuth server for authentication or authorization. Systems are desired to facilitate access by certificate-based clients to services which use token-based authentication/authorization.

DETAILED DESCRIPTION

The following description is provided to enable any person in the art to make and use the described embodiments. Various modifications, however, will be apparent to those in the art.

Some embodiments provide a technical solution to the technical problem of incompatibilities between authentication/authorization mechanisms of a client computing system and of a service or application having technical resources to which the client computing system desires access. Generally, some embodiments allow clients which use certificate-based mutual authentication to access services which use token-based delegated authentication and authorization services. For example, according to some embodiments, a client ERP server initiates TLS mutual authentication with an endpoint associated with a cloud application or service, an authorization token is generated based on the mutual authentication as described below, and the cloud application or service provides resources to the client ERP server based on authorizations associated with the authorization token.

Figure 1:
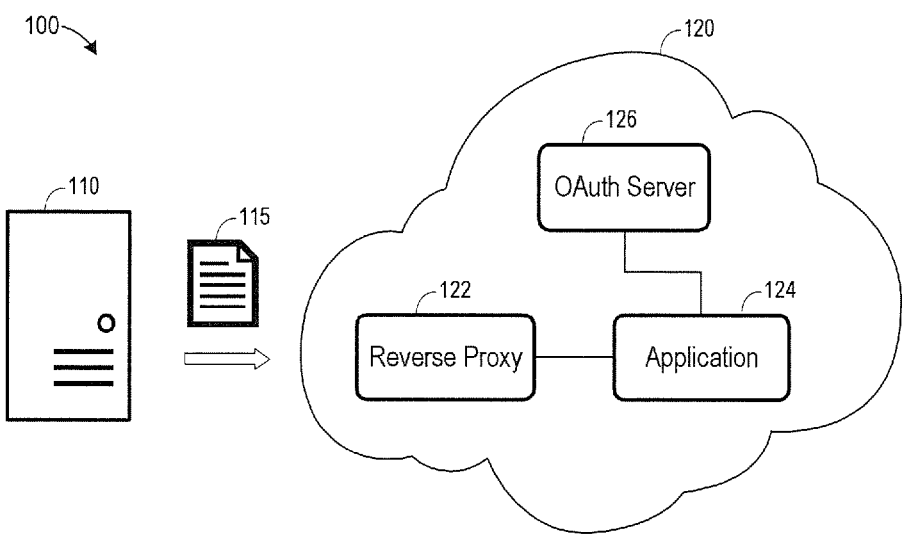
FIG. 1 is a diagram of an architecture including a Transport Layer Security client and an application using an OAuth server for authorization according to some embodiments.

FIG. 1 is a block diagram of system 100 according to some embodiments. Embodiments are not limited to the FIG. 1 system. System 100 includes client 110 and cloud network 120. Cloud network 120 may comprise any number of public or private networks and includes reverse proxy 122, application 124 and OAuth server 126.

Client 110 may comprise any type of computing system executing any program code that is or becomes known. According to some embodiments, client 110 comprises an on-premise server, a private cloud service or a public cloud service providing functionality to respective client devices. As shown, client 110 provides authentication certificate 115 to cloud 120 in order to access services of application 124. Authentication certificate 115 may specify a named entity operating client system 110. Certificate 115 may conform to the X.509 certificate protocol, which specifies fields and extensions intended to control certificate usage and provide security to communications based thereon. Certificate 115 may have been issued by an external or internal certificate authority as is known in the art.

Reverse proxy 122 may distribute incoming requests to servers executing Web-based applications is known in the art. As will be described in detail below, reverse proxy 122 may terminate a TLS connection which was initiated by client 110 using certificate 115. Reverse proxy 122 may provide the certificate to application 124, which may in turn request a token from OAuth server 126 based on the certificate. Application 124 may then serve requests from client 110 based on authorizations associated with the token.

Each component of system 100 and all other systems described herein may be implemented by one or more computing devices (e.g., computer servers), storage devices (e.g., hard or solid-state disk drives), and other hardware as is known in the art. The components of cloud 120 may be located remote from one another and may be elements of one or more cloud computing platforms, including but not limited to a Software-as-a-Service, a Platform-as-a-Service, and an Infrastructure-as-a-Service platform.

Figure 2:
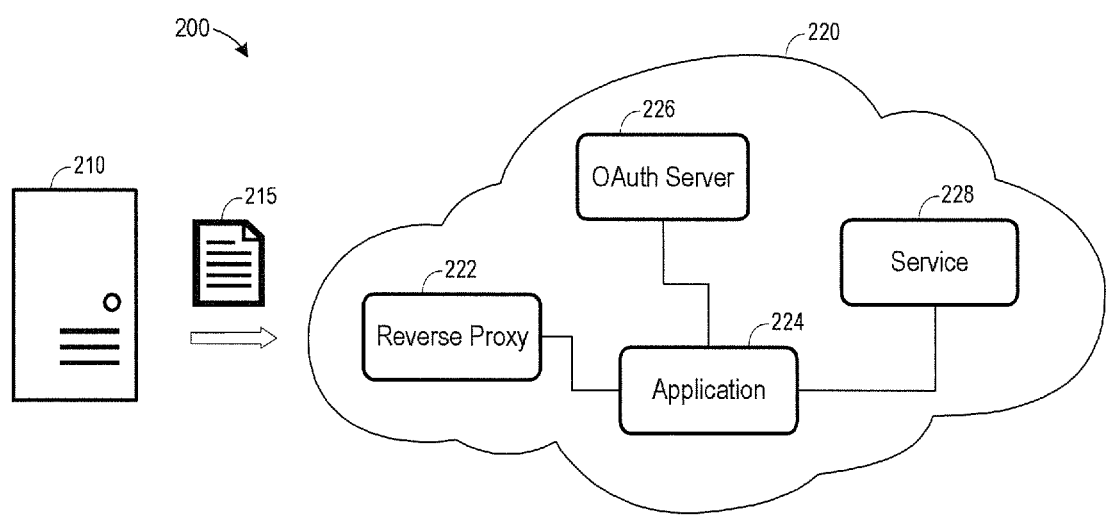
FIG. 2 is a diagram of an architecture including a Transport Layer Security client and an application and a service using an OAuth server for authorization according to some embodiments.

FIG. 2 is a block diagram of system 200 including client 210 and cloud network 220. System 200 is similar to system 100 of FIG. 1 except for the inclusion of service 228. With reference to the above operational example of FIG. 1, it is assumed that application 224 requires resources from service 228 in order to fulfill a request received from client 210. Application 224 may forward a request to service 228 along with the token previously-received from OAuth server 226. Since service 228 also uses OAuth server 226 for authentication and authorization, service 228 may provide resources to application 224 based on authorizations associated with the forwarded token, without requiring further authentication or authorization activity.

Figure 3:
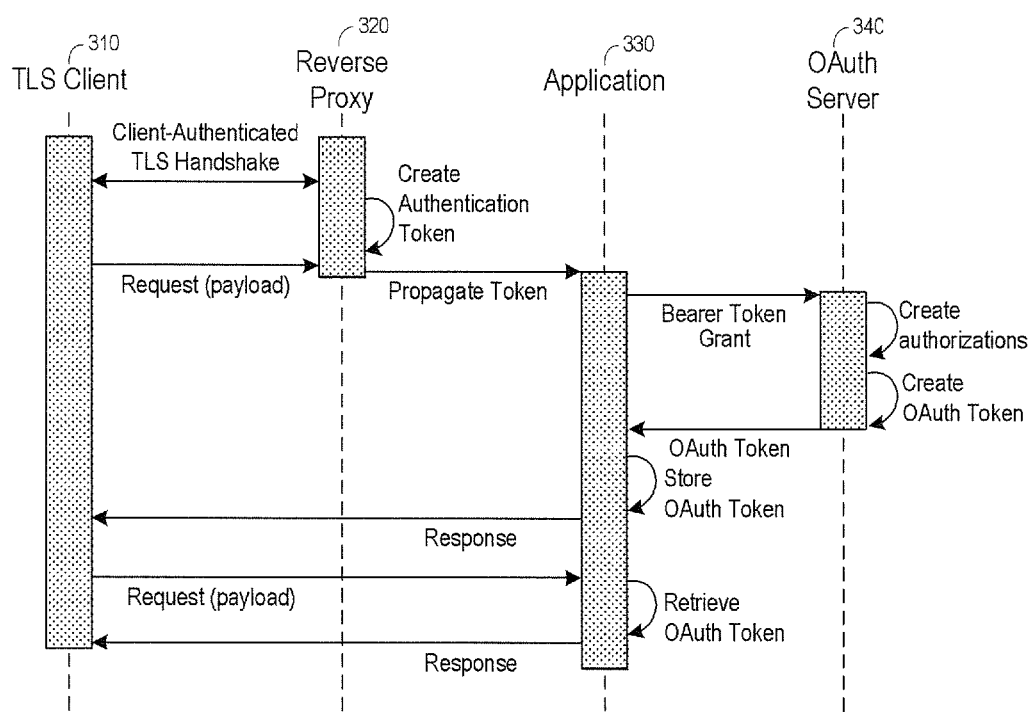
FIG. 3 is a sequence diagram illustrating authentication of a Transport Layer Security client to an OAuth server for accessing an application according to some embodiments.

FIG. 3 is a sequence diagram of a process flow according to some embodiments. TLS client 310, reverse proxy 320, application 330 and OAuth server 340 may be implemented as shown with respect to respectively-named client 110, reverse proxy 120, application 124 and OAuth server 126 of system 100, but embodiments are not limited thereto.

Initially, TLS client 310 initiates a TLS handshake with reverse proxy 320. Reverse proxy 320 executes the server portion of handshake to establish a secure, mutually-authenticated communication channel as is known in the art. Mutual authentication indicates that reverse proxy 320 has confirmed the identity of the entity controlling TLS client 310 and TLS client has confirmed the identity of the entity controlling reverse proxy 320. Accordingly, the TLS handshake includes transmission of a X.509 certificate from TLS client 310 to reverse proxy 320 and transmission of a X.509 certificate from reverse proxy 320 to TLS client 310.

Next, reverse proxy 320 creates an authentication token based on the X.509 certificate received from TLS client 310. For example, reverse proxy 320 may extract information from the certificate and wrap the information into a JSON Web Token (JWT) token using a local key, resulting in a signed JWT token. In some embodiments the JWT token includes the entire certificate.

TLS client 310 then sends a request over the established mutually-authenticated secure channel. Reverse proxy 320 adds the authentication token to an HTTP header of the request and forwards the request (thereby propagating the authentication token) to application 330.

Application 330 may comprise an implementation of a REST service, using OAuth server 340 for authentication and authorization services. Application 330 therefore accepts the token issued by reverse proxy 320 and uses the JWT bearer token grant flow (e.g., https://tools.ietf org/html/rfc7523) to authenticate client 310 and broker the token for an OAuth token. Application 330 is a registered client of OAuth server 340 and therefore uses a client id, client secret and URL of a corresponding OAuth service binding to execute the JWT bearer token grant flow. In a case that application 330 is a Spring application, the JWT bearer token grant flow may be implemented using a custom TokenExtractor implementation.

Reverse proxy 320 has been previously established as an identity provider to OAuth server 340. Accordingly, upon receiving the JWT token issued by reverse proxy 320 (and signed using the private key of reverse proxy 320) from application 330, OAuth server 340 may confirm the provenance of the JWT token using a corresponding public key of proxy 320. OAuth server 340 then creates an OAuth token and associates the OAuth token with the authorizations.

The OAuth token is returned to application 330 and stored thereby in association with a session ID of the current HTTP session, or with a stateless index such as the client certificate itself. Application 330 may then provide a response to the request of client 310 based on the authorizations specified by the OAuth token.

As shown, client 310 may issue a next request within a same HTTP session, which continues over the mutually-authenticated secure channel established between client 310 and reverse proxy 320. The request is forwarded to application 330, which checks its cache for an OAuth token associated with the current session ID. After identifying the previously-stored OAuth token, application 330 responds to the next request based on the authorizations specified by the OAuth token. The foregoing process may continue until the session is terminated.

Figure 4:
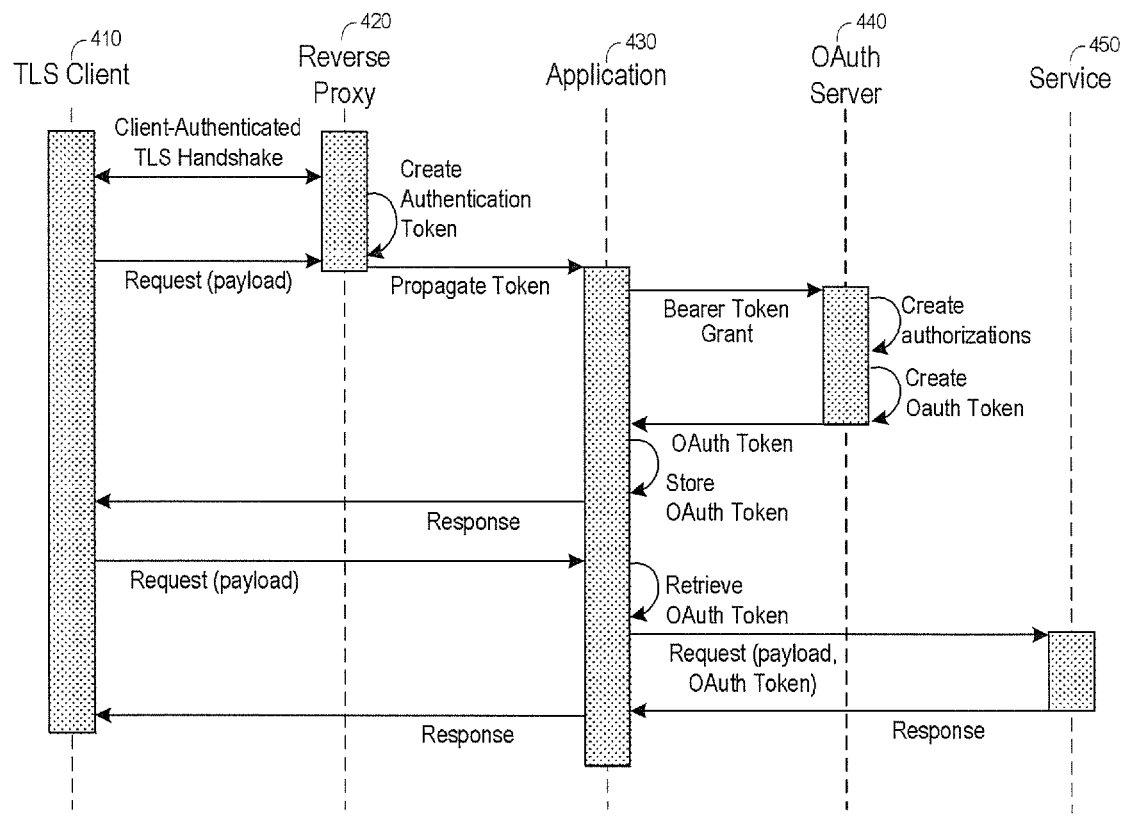
FIG. 4 is a sequence diagram illustrating authentication of a Transport Layer Security client to an OAuth server for accessing an application which accesses a service according to some embodiments.

FIG. 4 is a sequence diagram of a process flow relating to system 200 of FIG. 2. The process of FIG. 4 is similar to the process of FIG. 3, however the second request issued by client 410 requires functionality of a second service, illustrated as service 450. Upon receiving the second request, application 430 retrieves an associated stored OAuth token as described above with respect to FIG. 3. Application 430 then issues a request including the OAuth token to service 450.

Service 450 is also a client of OAuth server 440 and therefore accepts OAuth tokens issued thereby. Service 450 therefore generates a response to the request from application 430 based on authorizations specified by the OAuth token and returns the response to application 430. Application 430 uses the response and the authorizations of the OAuth token to generate a response to the second request received from client 410.

Figure 5:
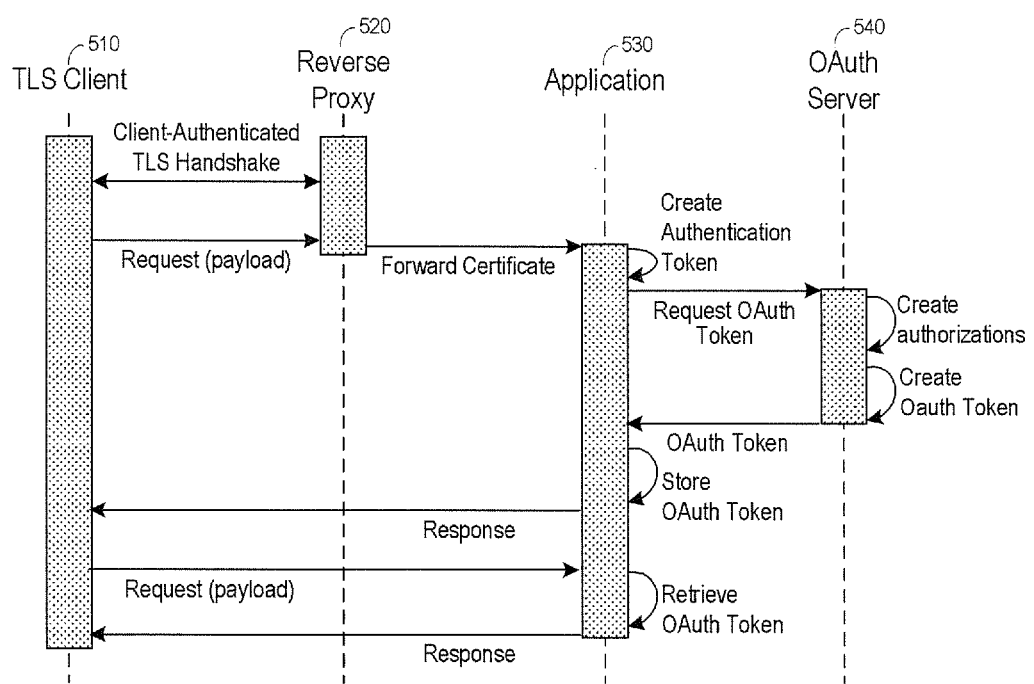
FIG. 5 is a sequence diagram illustrating authentication of a Transport Layer Security client to an OAuth server for accessing an application according to some embodiments.

FIG. 5 is a sequence diagram of a process according to some embodiments. The process of FIG. 5 differs from the process of FIG. 3 in that reverse proxy 520 does not generate a token based on the client certificate provided by client 510. Rather, the certificate is forwarded (e.g., within an HTTP header) from reverse proxy 520 to application 530.

As illustrated, application 530 creates an authentication token and requests an OAuth token from OAuth server 540. To issue the request, application 530 may map the certificate to a set of credentials used for authentication to OAuth server 540. Alternatively, if application 530 is registered as an identity provider to OAuth server 540, application 530 may broker the token for an OAuth token using a JWT bearer flow. The JWT bearer flow may be grant-type (e.g., urn:ietf:params:oauth:grant-type:jwt-bearer) for communication on behalf of a named user or client assertion-type (e.g., urn:ietf:params:oauth:client-assertion-type:jwt-bearer) for technical communication on behalf of application 530. The remainder of the FIG. 5 sequence may proceed as described with respect to FIG. 3.

Figure 6:
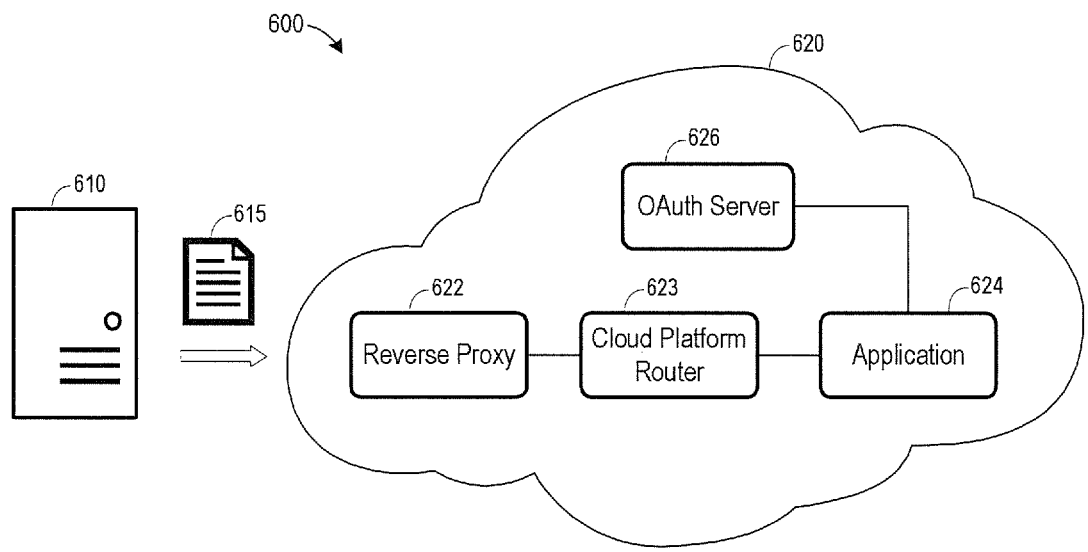
FIG. 6 is a diagram of an architecture including a Transport Layer Security client and an application using an OAuth server for authorization according to some embodiments.

FIG. 6 illustrates system 600 according to some embodiments. System 600 is identical to system 100 except for the inclusion of cloud platform router 623 between reverse proxy 622 and application 624. According to some cloud platform implementations, cloud platform router 623 may provide load balancing between multiple instances (not shown) of application 624. System 600 may operate as described above with respect to FIGS. 1, 3 and 5, with cloud platform router 623 simply passing along communications between reverse proxy 622 and application 624.

Figure 7:
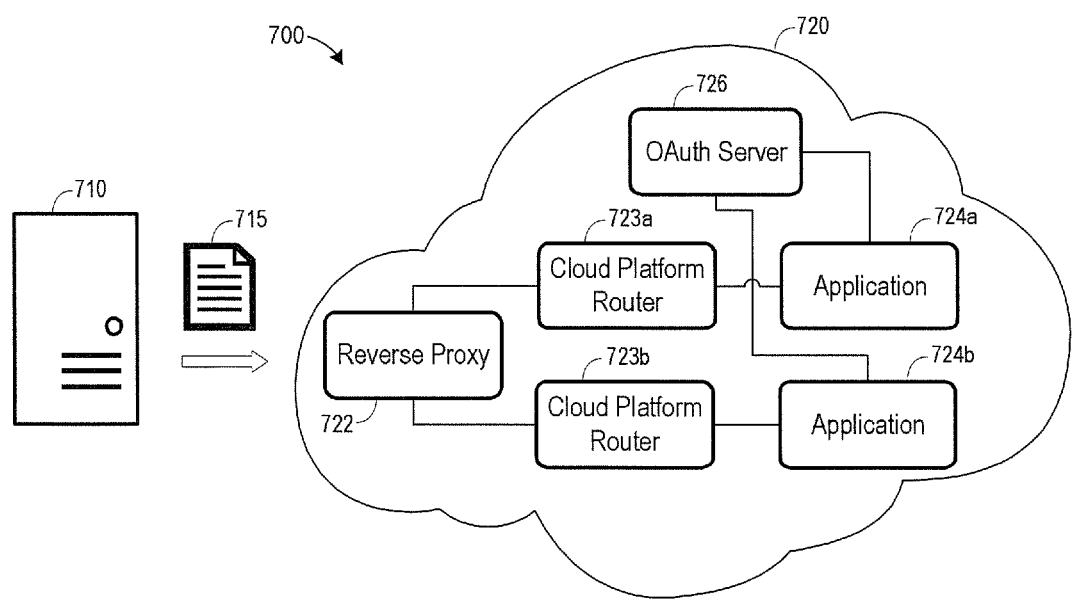
FIG. 7 is a diagram of an architecture including a Transport Layer Security client and two applications using an OAuth server for authorization according to some embodiments.

FIG. 7 illustrates system 700 according to some embodiments. System 700 includes two different applications 724*a* and 724*b*, each of which may operate as described above upon receiving a request for services from client 710. Each of applications 724*a* and 724*b* is a client of OAuth server 726 and uses authorization services provided by OAuth server 726. Each of applications 724*a* and 724*b* is associated with a respective one of cloud platform routers 723*a* and 723*b* which may operate as described with respect to router 623. Some embodiments may omit cloud platform routers 723*a* and 723*b*.

Figure 8:
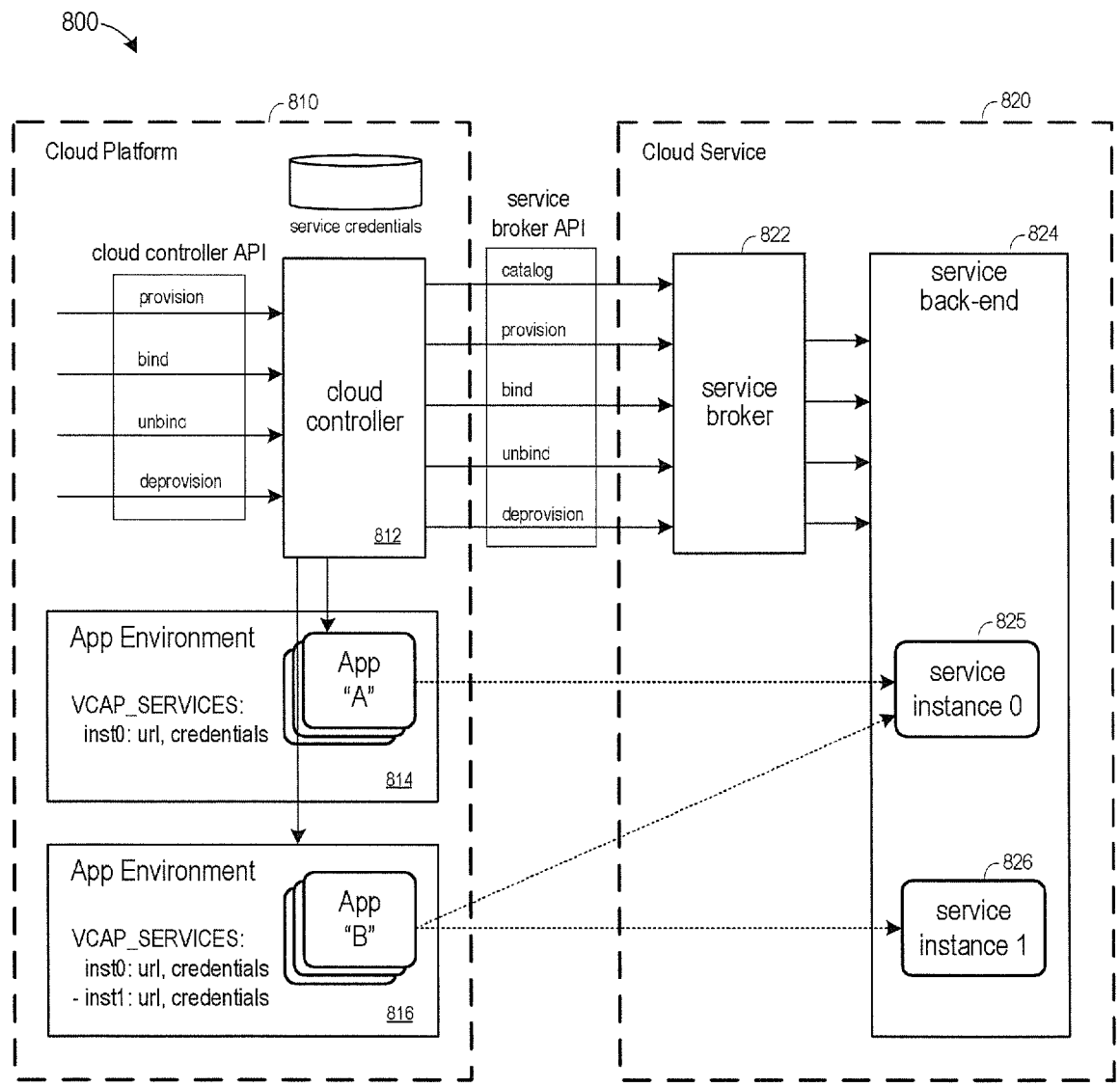
FIG. 8 is a block diagram of a cloud platform and cloud service according to some embodiments.

FIG. 8 is a block diagram of cloud platform 810 and cloud service 820 according to some embodiments. Cloud platform 810 may allow an entity to deploy network applications or services without concerns regarding underlying computing infrastructure. Cloud controller 812 executes applications within application environments 814 and 816, balancing demand by running duplicate instances of applications and managing application lifecycles.

Applications executing in cloud platform 810 may depend on cloud service 820 such as databases or third-party APIs. A service is incorporated into an application by service broker 822, which is an API that publishes to Cloud Controller 812 the ability to list service offerings, provision the service, and enable applications to make calls out to it. A 'provision' call may reserve resources on a service and a 'bind' call may deliver information to an application necessary for accessing the resource. Service instances 825 and 826 are reserved resources, each of which may represent a single database on a multi-tenant server, a dedicated cluster, or an account on a web application, for example.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions.

Embodiments described herein are solely for the purpose of illustration. Those in the art will recognize other embodiments may be practiced with modifications and alterations to that described above.

What is claimed is:

1. A computing system comprising:
    a reverse proxy component to:
    receive a public key certificate from a client computing system;
    execute a mutual authentication handshake with the client computing system to authenticate the client computing system based on the public key certificate;
    generate an authentication token based on the public key certificate; and
    receive a request from the client computing system; and
    an application to:
    receive the request and the authentication token from the reverse proxy component;
    request an authorization token from an Open Authorization (OAuth) server based on the authentication token received from the reverse proxy component;
    receive the authorization token from the OAuth server;
    store the authorization token received from the OAuth server in association with a session identifier associated with the request received from the client computing system; and
    transmit a response to the client computing system based on the authorization token received from the OAuth server and the request received from the client computing system.

2. A computing system according to claim 1, further comprising a service to:
    receive a request from the application including the authorization token; and
    transmit a response to the application based on the authorization token and the request received from the application.

3. A computing system according to claim 1, wherein generation of the authentication token comprises extraction of information from the public key certificate and wrapping of the information into a signed JavaScript Object Notation (JSON) Web Token token using a private key associated with the reverse proxy.

4. A computing system according to claim 3, the reverse proxy to add the signed JSON Web Token token to a HyperText Transfer Protocol header of the request which is received by the application.

5. A computing system according to claim 1, wherein the reverse proxy is a registered identity provider of the OAuth server, and wherein the application requests the authorization token from the OAuth server using a JSON Web Token bearer token grant flow.

6. A computing system according to claim 1, the reverse proxy to add the authentication token to a HyperText Transfer Protocol header of the request which is received by the application.

7. A computing system according to claim 1, wherein the reverse proxy is a registered identity provider of the OAuth server, and wherein the application requests the authorization token from the OAuth server using a JSON Web Token bearer token grant flow.

8. A computer-implemented method comprising:
    terminating, at a reverse proxy, a mutual authentication handshake with a client computing system, the handshake including reception by the reverse proxy of a public key certificate associated with the client computing system;
    generating, by the reverse proxy, of an authentication token based on the public key certificate; and
    receiving, at the reverse proxy, a request to access an application from the client computing system;
    forwarding the request and the authentication token from the reverse proxy to the application;
    receiving the request and the authentication token at the application;
    requesting, by the application, of an authorization token from an Open Authorization (OAuth) server based on the authentication token;
    receiving the authorization token from the OAuth server;
    storing the authorization token received from the OAuth server in association with a session identifier associated with the request received from the client computing system; and
    transmitting a response to the client computing system based on the authorization token received from the OAuth server and the request received from the client computing system.

9. A computer-implemented method according to claim 8, further comprising:
    receiving, at a service, a request from the application including the authorization token; and
    transmitting, from the service, a response to the application based on the authorization token and the request received from the application.

10. A computer-implemented method according to claim 8, wherein generating the authentication token comprises extracting information from the public key certificate and wrapping of the information into a signed JavaScript Object Notation (JSON) Web Token token using a private key associated with the reverse proxy.

11. A computer-implemented method m according to claim 10, further comprising adding the signed JSON Web Token token to a HyperText Transfer Protocol header of the request which is received by the application.

12. A computer-implemented method according to claim 8, wherein the reverse proxy is a registered identity provider of the OAuth server, and wherein the application requests the authorization token from the OAuth server using a JSON Web Token bearer token grant flow.

13. A computer-implemented method according to claim 8, further comprising adding the authentication token to a HyperText Transfer Protocol header of the request which is received by the application.

14. A computer-implemented method according to claim 8, wherein the reverse proxy is a registered identity provider of the OAuth server, and wherein the application requests the authorization token from the OAuth server using a JSON Web Token bearer token grant flow.

15. A computing system comprising:
a reverse proxy component to:
receive a public key certificate from a client computing system;
execute a mutual authentication handshake with the client computing system to authenticate the client computing system based on the public key certificate; and
receive a request from the client computing system; and
an application to:
receive the request and the public key certificate from the reverse proxy component;
create an authentication token based on the public key certificate;
request an authorization token from an Open Authorization (OAuth) server based on the authentication token;
receive the authorization token from the OAuth server;
store the authorization token received from the OAuth server in association with a session identifier associated with the request received from the client computing system; and
transmit a response to the client computing system based on the authorization token received from the OAuth server and the request received from the client computing system.

16. A computing system according to claim 15, further comprising a service to:
receive a request from the application including the authorization token; and
transmit a response to the application based on the authorization token and the request received from the application.

17. A computing system according to claim 15, wherein the reverse proxy is a registered identity provider of the OAuth server, and wherein the application requests the authorization token from the OAuth server using a JavaScript Object Notation (JSON) Web Token bearer token grant flow.

18. A computing system according to claim 15, the reverse proxy to add the public key certificate to a HyperText Transfer Protocol header of the request which is received by the application.

* * * * *